United States Patent
Inman et al.

(10) Patent No.: US 6,775,963 B1
(45) Date of Patent: Aug. 17, 2004

(54) TUNNEL EXTENSION FOR BAGGING MACHINE

(75) Inventors: Larry R. Inman, Astoria, OR (US); Michael H. Koskela, Astoria, OR (US)

(73) Assignee: Ag-Bag International Limited, Warrenton, OR (US)

( * ) Notice: Subject to any disclaimer, the term of this patent is extended or adjusted under 35 U.S.C. 154(b) by 0 days.

(21) Appl. No.: 10/461,607

(22) Filed: Jun. 13, 2003

(51) Int. Cl.[7] .......................... B65B 9/15; B65B 39/06
(52) U.S. Cl. .......................... 53/576; 53/201; 53/257
(58) Field of Search .......................... 53/201, 527, 567, 53/576, 257; 100/100, 144; 141/74, 313, 114; 56/218, 228

(56) References Cited

U.S. PATENT DOCUMENTS

| | | | |
|---|---|---|---|
| 4,949,633 A | * | 8/1990 | Johnson et al. ............. 100/100 |
| 5,857,313 A | * | 1/1999 | Cullen .......................... 53/567 |
| 5,899,247 A | | 5/1999 | Cullen |
| 6,220,001 B1 | * | 4/2001 | Brodrecht ..................... 53/567 |
| 6,443,194 B1 | * | 9/2002 | Cullen .......................... 53/527 |
| RE38,020 E | | 3/2003 | Cullen |
| 6,591,588 B2 | * | 7/2003 | Inman et al. ................. 53/576 |

\* cited by examiner

*Primary Examiner*—John Sipos
(74) *Attorney, Agent, or Firm*—Schwabe, Williamson & Wyatt, P.C.

(57) ABSTRACT

A combination including, preferably, alternate tunnel extensions for a bagging machine, the extensions alternately fitted to a primary tunnel with quick-release fasteners. One of the extensions for filling a determined bag size and the other extension for filling a larger size bag. A bag support provided on the other extension for increasing the dimensional support for the bag to accommodate the larger bag size.

4 Claims, 4 Drawing Sheets

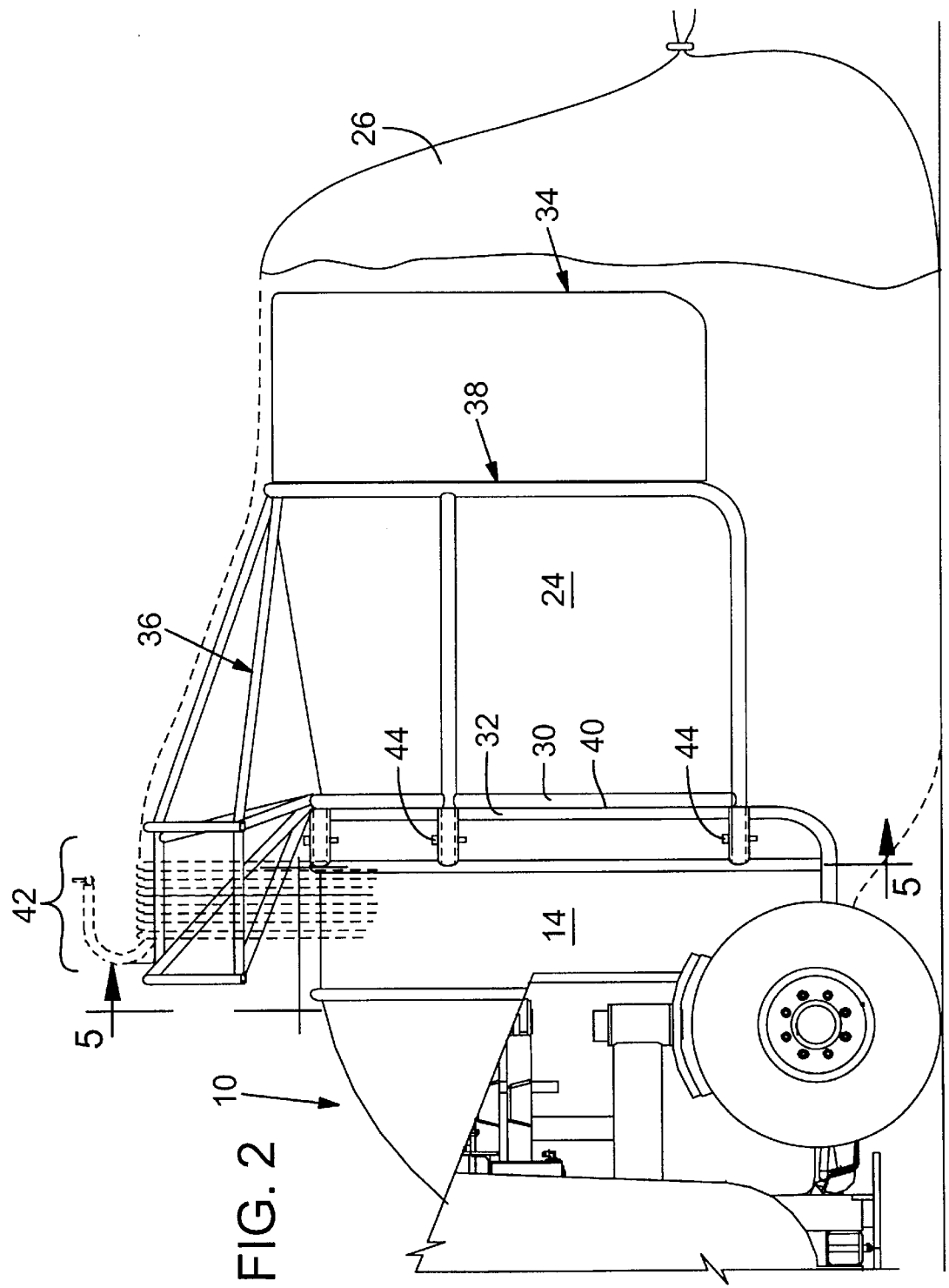

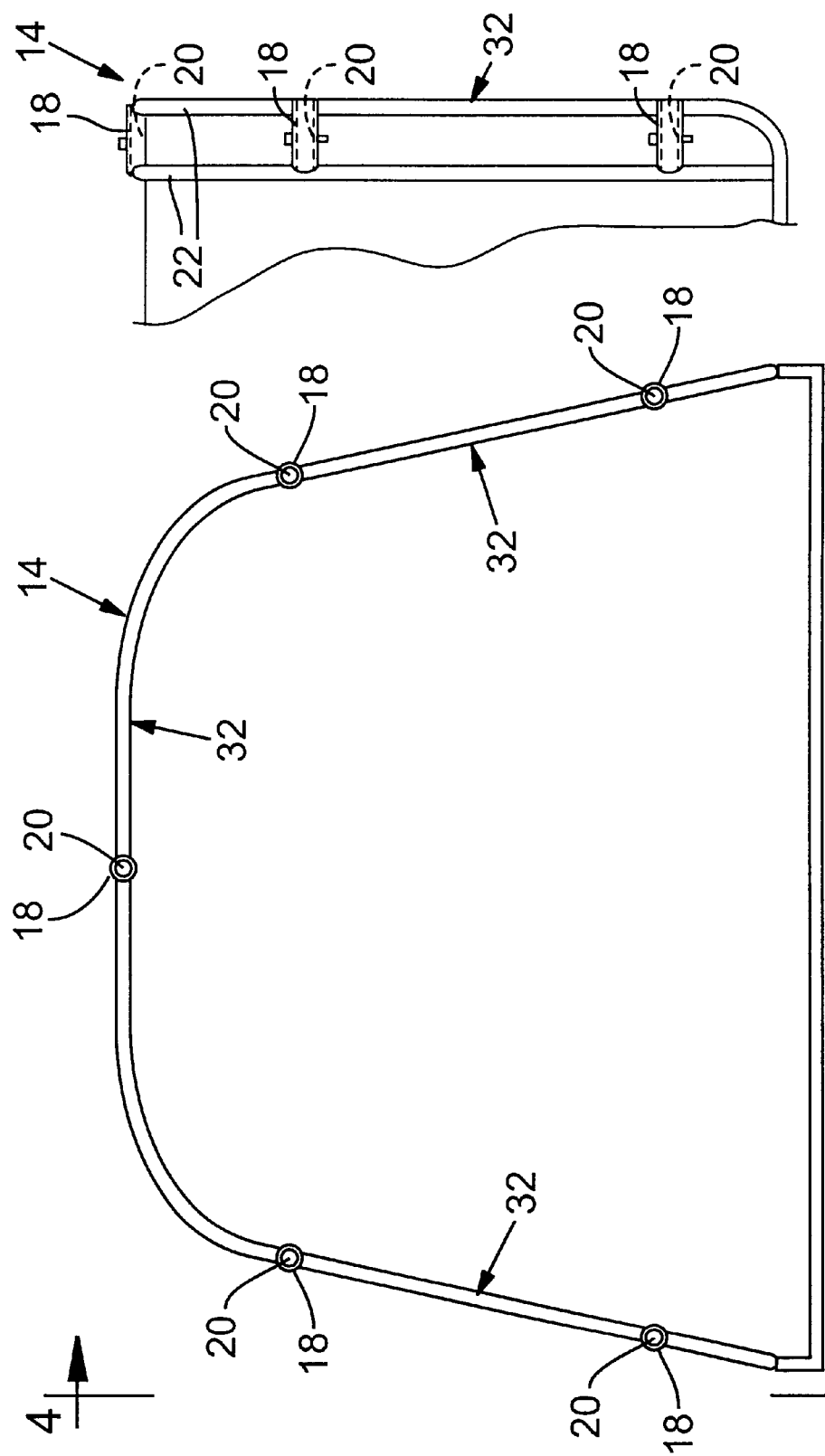

TUNNEL EXTENSION FOR BAGGING MACHINE

FIELD OF THE INVENTION

This invention relates to bagging machines used for bagging farm crops and the like, and, more particularly, it relates to a means for adapting a bagging machine designed for bagging crops in a particular bag size, to enable the machine to bag in a larger sized bag.

BACKGROUND OF INVENTION

Bagging machines of this invention place material, e.g., farm crops, in large bags having a circumference/cross section, e.g., of 10 feet, 12 feet, 14 feet, and having a length, e.g., 100 feet to 200 feet. The bags are desirably filled to capacity and to achieve that end, the bags are folded in a manner that enables them to be mounted to the exterior of the bagging machine's tunnel, the tunnel being sized to fit that particular bag size. A portion of the bag is extended from the tunnel's back end and the bag end is tied shut. The bag is accordingly held open by the tunnel to its near maximum opening (although not necessarily circular) and material is first packed into the tunnel interior having a similar cross sectional dimension before it is inserted into the bag from the tunnel's rear end opening. The pre-packed material is continuously forced into the tunnel and then inserted into the bag which is incrementally deployed off the tunnel.

The different bag sizes are selected to accommodate differing needs of the user/customer. Whatever bag size is desired, a bagging machine and matching bag size is provided to that customer. Should a customer wish to bag different crops in different bag sizes, the customer must either use different sizes of bagging machines, or acquire a bagging machine that is convertible to different bag sizes. (See U.S. Pat. No. 9/934998.)

The present invention is directed to a means for converting a standard fixed tunnel bagging machine to accommodate a larger bag size as may be desirable by a customer/farmer, e.g., when converting its use of the machine for grain bagging to silage bagging.

BRIEF DESCRIPTION INVENTION

In a preferred embodiment, a bagging machine, is designed to fill a bag e.g., having a 12-foot diameter opening. The rear end portion of the primary tunnel is typically provided with a removable tunnel extension of e.g., 4 feet in length. (The removable tunnel extension accommodates the need for downsizing of the machine for over-the-road hauling.) The added length is provided only for the top and sides and not the floor or bottom of the tunnel. Thus the bag bottom drops to the ground while still held open by the top and sides of the tunnel extension. It has been determined that this transition from all tunnel support to combined tunnel and ground support results in a better compaction/fill of the bag. (It is noted that compaction is typically facilitated by various mechanisms such as back stops or anchors.) The tunnel extension was previously considered a substantially semi-permanent fixture and likely secured by bolts at numerous positions around the mated end edges of the primary tunnel (rear end) and extension (forward end). For the present preferred embodiment of the invention, the extension (at its mated end edge) is provided with rearwardly projecting quick release pins (e.g., 5 pins—2 at each side and 1 at the top), and the primary tunnel is provided with sockets or tubular openings that receive the pins. The pins are locked into place e.g., with cotter pins projected through holes in the ends of the pins so that removal of the extension from the primary tunnel is simply a matter of releasing the lock (removal of the cotter pins) and withdrawal of the extension.

The extension is then replaced with a flared tunnel extension that flares outwardly from its forward end having a similar mated end edge, i.e., mated to the rear edge of the primary tunnel, to the larger size that is designed to fill a 14-foot bag. At the forward edge the flared extension is similarly provided with quick-release securement pins for similar quick-release connection to the primary tunnel.

The extension includes a top wall and opposing side walls that are flared outwardly to the greater size, e.g., 14 feet, and then preferably extends laterally a short distance, e.g., 4 feet, as desired for pre-compaction to the 14-foot bag size. Extended forwardly along the top of the extension from the position where the flaring portion of the tunnel becomes lateral, an assembly of tubes provides a bag support that is inclined back to front until it reaches the juncture whereat the extension and primary tunnel are joined, at which point the assembly of tubes extends laterally over a rear portion of the primary tunnel. This assembly of tubes supports the 14-foot bag. Because both the top and sides of the tunnel extension are inwardly angled or tapered back to front, to fully support the bag, the tube assembly support is forwardly inclined to maintain the bag in a fully supported position above the ground. That is, as the bag is mounted to the tunnel extension and continues forwardly along the tunnel, the sides and top being angled inwardly provide a continuously smaller circumference for supporting the larger bag and, without the tube assembly support, would result in the bag laying loose on the tunnel and thus dragging on the ground. The incline of the support is designed to eliminate the slack and maintain support of the bag. To facilitate mounting of the bag to the tunnel, a removal cradle is provided on which the bag is mounted. The cradle is designed with a lift arm that can be engaged by a hoist and then maneuvered into position on the bag support and surrounding the primary tunnel end.

A further understanding and appreciation of the invention will be obtained by reference to the following detailed description and accompanying drawings.

DESCRIPTION OF THE DRAWINGS

FIG. 2 is a side view of the bagging machine of FIG. 1, but having fitted thereto a flared tunnel extension for bagging into a larger sized bag than is shown in FIG. 1.

FIG. 3 is a rear view of the primary tunnel shown as if taken on view lines 3—3 of FIG. 1;

FIG. 4 is a side view of the back end portion of the primary tunnel as if taken on view lines 4—4 in FIG. 3;

DESCRIPTION OF PREFERRED EMBODIMENT

Figure 1:
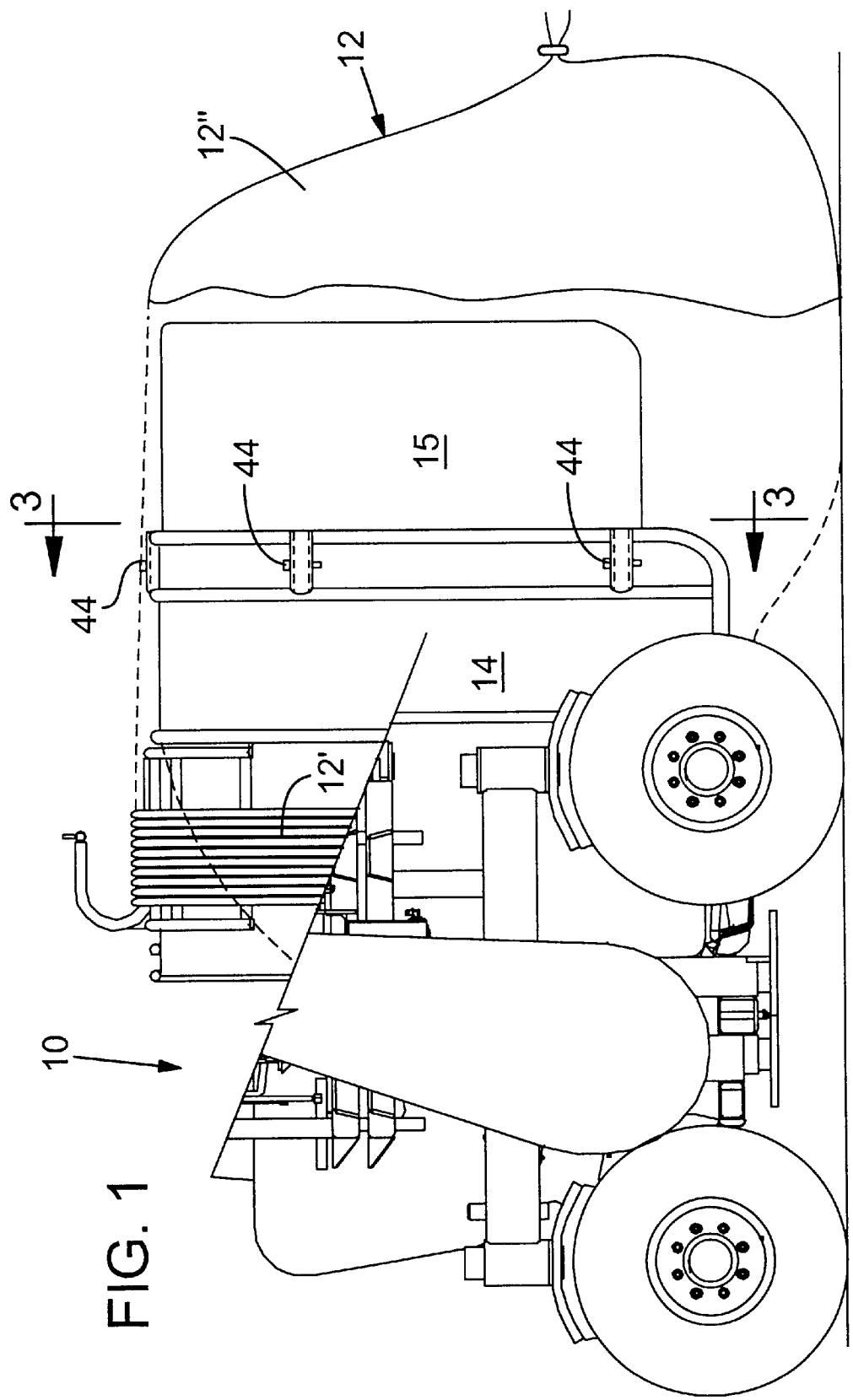
FIG. 1 is a side view of a bagging machine in accordance with the invention, shown in use for a primary bagging task.

Reference is made to FIG. 1 which shows a bagging machine 10 of the present invention being used to fill a bag 12, e.g., having a 12-foot diameter circumference. The bagging machine and bag are shown in the start up stage, e.g., with a folded bag portion 12' mounted in a manner to encircle the rear end of a tunnel 14 and a rear most end 12" being closed and tied shut as shown. As material flows into the tunnel, the material is first compacted inside the tunnel and then shoved into the deployed portion of the bag in a compacted condition. As the bag is filled, the machine 10 is moved forwardly and additional and incremental lengths of the bag portion 12' are deployed off the tunnel.

The tunnel 14 typically is fitted with a tunnel extension 15 as seen in FIG. 1. The extension 15 includes top and side walls and no floor or bottom wall and it is removable. As seen in FIGS. 3 and 4, the rear end of the primary tunnel only is shown (the bag and tunnel extension being removed from FIGS. 3 and 4), but otherwise the figures illustrate the rear end of the tunnel as if taken on view lines 3—3 of FIG. 1 (but excluding certain internal features, e.g., the feed rotor, which are not pertinent for an understanding of the invention herein). At five selected positions around the periphery of the primary tunnel's rear end, tubes or sockets 18 are integrated into the tunnel frame. The tubes 18 have a rear end opening 20 (forming a receiving socket), and, as shown in FIG. 4, they are extended between tensioning ribs 22. The tunnel extension 15, as seen in FIG. 1, is retained onto the primary tunnel in the same manner as the flared tunnel extension to be explained.

Figure 5:
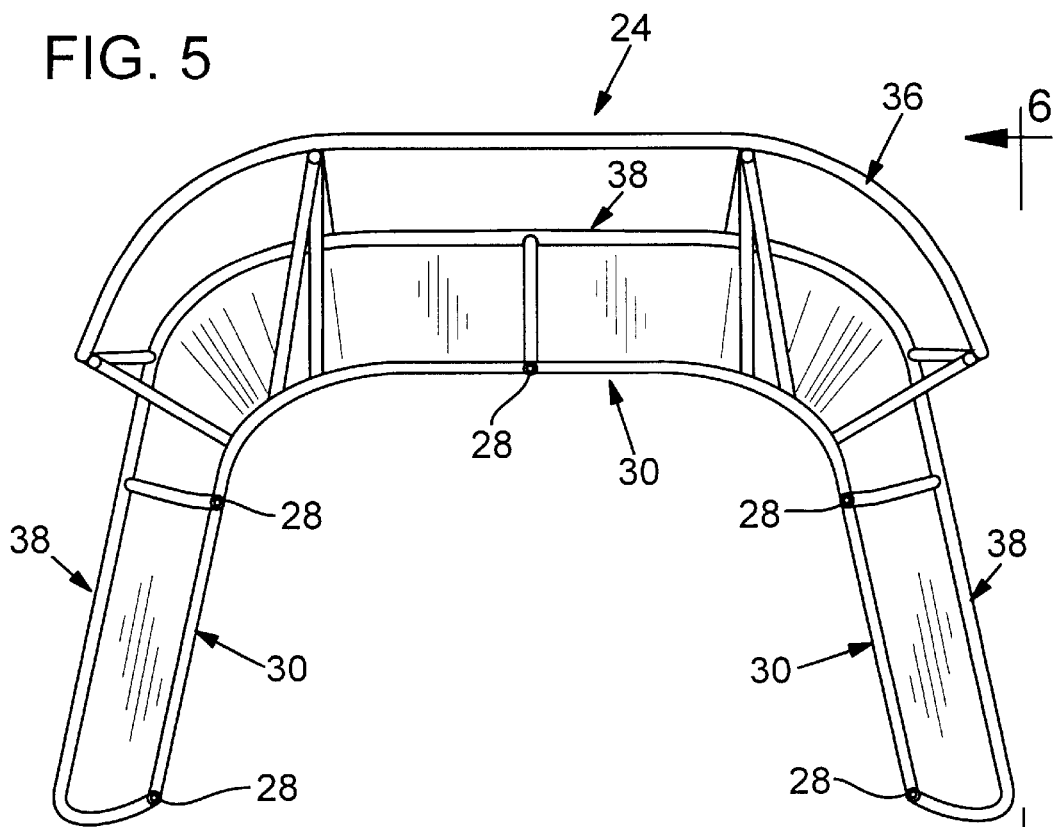
FIG. 5 is a front end view of the flared tunnel extension as if taken on view lines 5—5 of FIG. 2 and FIG. 6.
Figure 6:
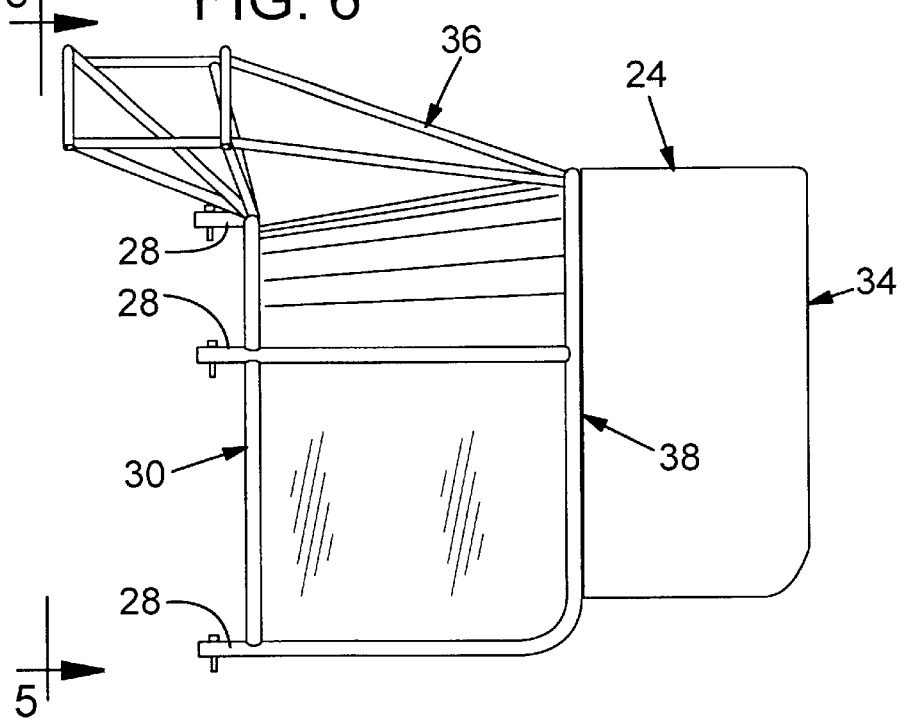
FIG. 6 is a side view as if taken on view lines 6—6 of FIG. 5.

Reference is now made to FIG. 2 which shows the same bagging machine 10 of FIG. 1 but provided with a modified, i.e., flared, tunnel extension 24, and a bag 26 having an increased diameter, e.g., 14 feet. FIG. 5 is a rear view of the modified tunnel extension 24 (view lines 5—5 of FIGS. 2 and 6) and the reader is referred also to FIG. 3 which, as explained above, is a rear view of the primary tunnel 14. As will be noted from FIGS. 5 and 6, pins 28 extend forward from the tunnel extension 24 and are positioned for insertion into openings 20 in tubes 18 at the rear end of the primary tunnel 14.

It is to be noted that the modified or flared tunnel extension 24 is configured to have a front end 30 configured to correspond to the configuration of the rear end 32 of the primary tunnel 14. The tunnel extension 24 flares outwardly from front end 30 (at juncture 40 in FIG. 2) to a desired circumference 38 and then laterally from that circumference rearward to a rear end 34, as denoted in FIGS. 2, 5 and 6. The lateral rear end, i.e., rearward of juncture 38, provides the desired configuration for material compaction. Note particularly from FIG. 5 that the flaring between position 30 and 38 occurs at both sides and the top of the modified tunnel extension.

In the case of the primary tunnel 14 and tunnel extension 15 (of FIG. 1) the configuration of the tunnel throughout corresponds in size to the 12-foot bag. In the case of the tunnel extension 24, and specifically in the angled portion thereof (between 38 and 30), the circumference tapers inwardly back to front and increasingly does not adequately support the bag opening.

To accommodate this disparity, a support 36 is mounted to the tunnel extension. The support 36 of the preferred embodiment is an arrangement of tubular members that provides an inclining, back to front, support that extends forward from juncture 38 to the juncture 40, and then laterally forward of juncture 40 to overly the rear end of the primary tunnel. The incline portion is desirable in that the slack is produced by the flaring of both the top and sides of the tunnel extension, whereas the support 36 is provided at the top only of the tunnel. The incline of the support accordingly accommodates the declining width dimension. At the juncture 40, the cradle extends laterally rearwardly a length 42 whereat the folded bag is stored for deployment as indicated by the dash lines of FIG. 2.

Whereas the configuration of the bagging machine is designed for a 12-foot bag, there are crops which compact more readily than others and e.g., a machine designed to bag alfalfa in a 12-foot bag will function satisfactorily for bagging, e.g., corn silage, in a 14-foot bag when equipped with the flared extension. As will be apparent, the bag extension 15 for a 12-foot bag is readily removed by removal of the cotter pin locks 44 from the pins 28 and withdrawing the tunnel extension. The modified tunnel is mounted in its place and the cotter pins 44 reapplied to lock the modified tunnel extension to the machine. The bag is mounted to cradle 36, the end tied off (in the manner as illustrated for FIG. 1) and the machine is ready for bagging, e.g., corn silage in the 14-foot bag.

The preferred embodiment as described above is but an example of an embodiment of the invention and those skilled in the art will conceive of numerous modifications without departing from the inventive concept as defined in the claims appended hereto.

What is claimed is:

1. A combination bagging machine configured to bag material in a given bag size, and a tunnel extension for adapting the machine to a larger bag size, comprising:
    a bagging machine including a primary tunnel having front and rear ends, a material feed mechanism feeding material into the front of the tunnel and said tunnel defining a rear end opening with a rear peripheral edge, said primary tunnel adapted to fit a determined bag size;
    a tunnel extension having a front peripheral edge, said front peripheral edge of the tunnel extension configured to mate with said rear peripheral edge of said primary tunnel and a fastening mechanism securing said rear peripheral edge to said front peripheral edge; and
    said tunnel extension having flared top and sides and providing a secondary rear opening larger than said rear end opening fitted to a larger bag size, and a bag support extended over said tunnel extension for supporting said larger size bag to prevent undesired looseness of the larger bag size.

2. A combination as defined in claim 1 wherein the flared top and sides define a forward position corresponding in size to said rear end opening and the determined bag size and a rearward position corresponding in size to said secondary rear opening and the larger bag size, and the bag support inclined from the rearward position to the forward position.

3. A combination as defined in claim 2 wherein the fastening mechanism is a quick-release fastener comprising a plurality of pins projected from the periphery of one of said front peripheral edge and said rear peripheral edge, and a corresponding plurality of pin-receiving sockets provided on the other of said front peripheral edge and said rear peripheral edge, and removable lock pins locking said pins as inserted into said socket.

4. A combination as defined in claim 1, including a standard tunnel extension extended rearwardly of said primary tunnel and providing a secondary rear end opening adapted to fit said determined bag size, and a front peripheral edge of said standard tunnel extension mated to the rear peripheral edge of the primary tunnel, and a quick-release fastener alternately releasably fastening either of the rear peripheral edges of the standard tunnel extension and tunnel extension having flared sides to the front peripheral edge of the primary tunnel.

* * * * *